United States Patent [19]
Daugherty et al.

[11] Patent Number: 5,597,194
[45] Date of Patent: Jan. 28, 1997

[54] HIGH FRICTION, NON-SLIP, FLEXIBLE AND HEAT RESISTANT PLASTIC NET

[75] Inventors: David Daugherty; Janet Rivett, both of Stone Mountain, Ga.

[73] Assignee: The Tensar Corporation, Atlanta, Ga.

[21] Appl. No.: 419,606

[22] Filed: Apr. 10, 1995

[51] Int. Cl.$^6$ ................................. B62D 33/02
[52] U.S. Cl. ........................ 296/39.2; 525/240
[58] Field of Search ................... 296/39.1, 39.2; 525/240; 87/35

[56] References Cited

U.S. PATENT DOCUMENTS

| | | | |
|---|---|---|---|
| 2,919,467 | 1/1960 | Mercer. | |
| 3,814,473 | 6/1974 | Lorenzen, Jr. | 296/39 R |
| 4,047,749 | 9/1977 | Lambitz et al. | 296/39 R |
| 4,161,335 | 7/1979 | Nix et al. | 296/39 R |
| 4,333,678 | 6/1982 | Munoz et al. | 296/39 R |
| 4,402,409 | 9/1983 | Slocumb | 206/597 |
| 4,428,306 | 1/1984 | Dresen et al. | 108/53.3 |
| 4,575,146 | 3/1986 | Markos | 296/39 R |
| 4,592,583 | 6/1986 | Dresen et al. | 296/39 R |
| 4,693,507 | 9/1987 | Dresen et al. | 296/39 R |
| 4,741,442 | 5/1988 | Slocumb | 206/597 |
| 4,749,306 | 6/1988 | Demeny et al. | 405/45 |
| 4,802,705 | 2/1989 | Elwell | 296/39.2 |
| 4,944,612 | 7/1990 | Abstetar et al. | 296/39.2 |
| 5,056,960 | 10/1991 | Marienfeld | 405/270 |
| 5,092,468 | 3/1992 | Slocumb | 206/597 |
| 5,131,709 | 7/1992 | Spica | 296/39.1 X |
| 5,324,800 | 6/1994 | Welborn, Jr. et al. | 526/160 |
| 5,344,714 | 9/1994 | Su | 428/516 |
| 5,370,436 | 12/1994 | Martindale et al. | 296/39.2 |

FOREIGN PATENT DOCUMENTS 0259165  3/1988  European Pat. Off..
2255292  11/1992  United Kingdom.

*Primary Examiner*—Joseph D. Pape
*Attorney, Agent, or Firm*—Jacobson, Price, Holman & Stern, PLLC

[57] ABSTRACT

A high friction, non-slip, flexible and heat resistant plastic net which can be used in various applications, for example, as a truck bed liner. The net is a blend of plastics having different densities and peak melting points. The first component of the blend is preferably a very-low-density to high-density polyethylene or a metallocene polyethylene. The second component of the blend is preferably an ultra-low-density polyethylene plastomer.

24 Claims, 4 Drawing Sheets

HIGH FRICTION, NON-SLIP, FLEXIBLE AND HEAT RESISTANT PLASTIC NET

BACKGROUND OF THE INVENTION

1. Field of the Invention

The invention relates to a high friction, non-slip, flexible and heat resistant plastic net which can be used in various applications, for example, as a truck bed liner.

2. Description of the Related Art

A variety of products are known for use as truck bed liners. These products are typically solid plastic shells that fit inside the cavity of a truck bed and solid rubber mats that lay in the bottom of a truck bed. These products suffer from the disadvantages that they are relatively expensive, relatively heavy weight and do not allow water to drain away and evaporate with no moisture collection under the solid plastic shell or solid rubber mat.

The solid plastic shells and solid plastic mats are typically formed from high density polyethylene or the like. High density polyethylene and similar plastics have a relatively low coefficient of friction. This may create problems if cargo slides too freely across the top surfaces of the liners during transportation.

Truck bed liners are typically rigid products having a relatively high flex modulus. Due to the nature of the terrain over which trucks frequently travel, these truck bed liners may crack if the plastic used for the liner is too rigid.

Although many plastics have been proposed for use in truck bed liners, many of these plastics do not have good heat resistance at relatively high temperatures. Heat resistance at relatively high temperatures is an important characteristic for a truck bed liner, especially in many hot, arid regions.

It is known to form nets for various applications from a variety of plastics. For example, high density polyethylene nets are known. However, these nets not only have a relatively low coefficient of friction, but also frequently will not lay down flat for use as a truck bed liner mat.

SUMMARY OF THE INVENTION

It is an object of the invention to provide an improved high friction, non-slip, flexible and heat resistant plastic net.

It is another object of the invention to provide an improved truck bed liner.

It is a further object of the invention to provide a plastic net that is relatively inexpensive to manufacture, lightweight, and has good heat resistance properties.

According to the invention, there is provided an improved high-friction, non-slip, flexible and heat resistant plastic net which is a blend of plastics having different densities and peak melting points. The first component of the blend is preferably a very-low-density to high-density polyethylene or a polyethylene formed using single-site metallocene catalyst technology. The second component of the blend is preferably an ultra-low-density polyethylene plastomer. When the blend is extruded as a net, it has particularly advantageous properties including (1) high friction, non-slip characteristics on at least one surface, (2) flexibility, i.e., a low flex modulus, and (3) heat resistance at relatively high temperatures.

According to a preferred aspect of the invention, the high friction, non-slip, flexible and heat resistant plastic net is used as a truck bed liner. In this application, the plastic net is provided with heat resistance at temperatures of at least 170° F., preferably at least 200° F. The net would typically be manufactured in roll form. The customer would cut out the net and lay it in a truck bed with the high friction, non-slip surface of the net in contact with the truck bed.

DETAILED DESCRIPTION OF THE DRAWINGS

Figure 1:
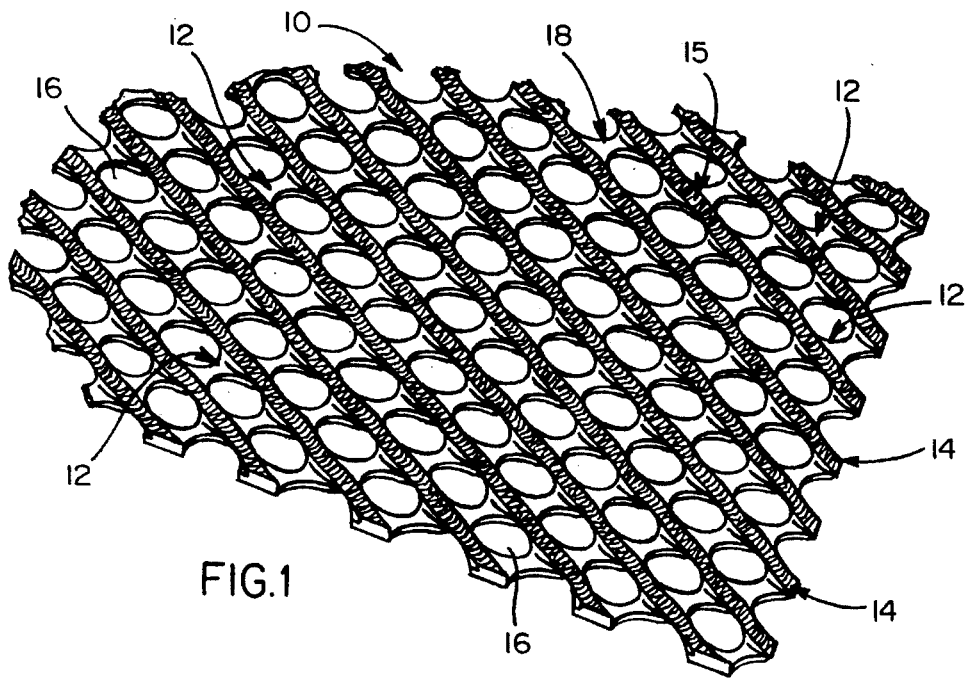
FIG. 1 is a perspective view of a portion of the top surface of net product according to the invention.
Figure 2:
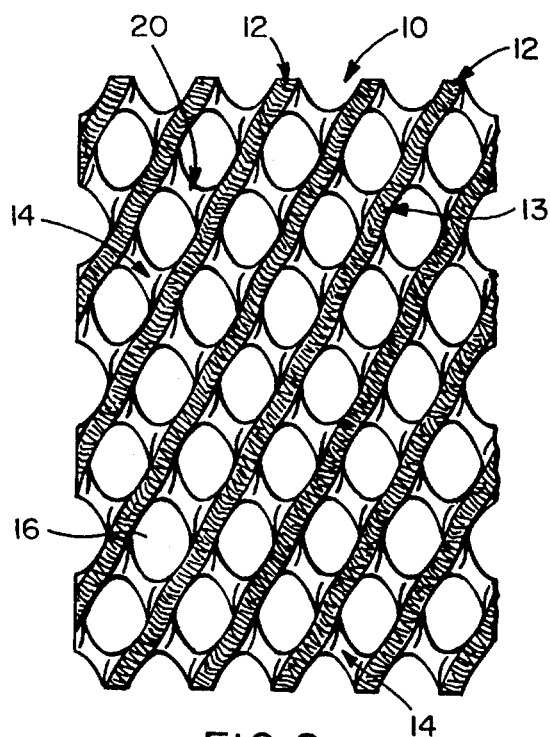
FIG. 2 is a top plan view of a portion of the bottom surface of the net product of FIG. 1.
Figure 3:
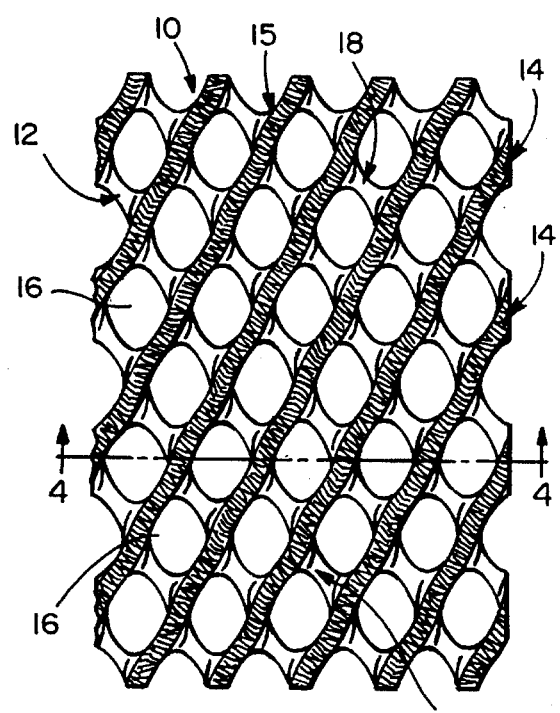
FIG. 3 is a top plan view of a portion of the top surface of the net product of FIG. 1.
Figure 4:
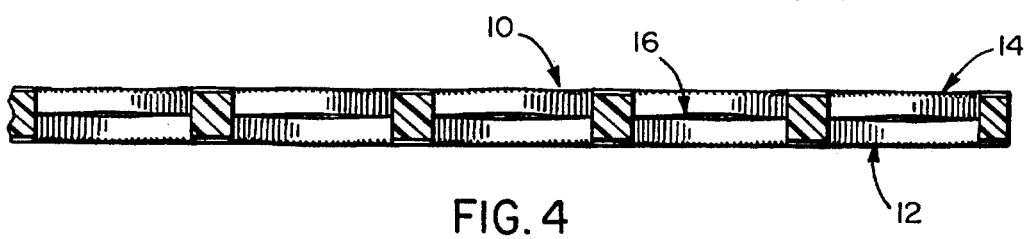
FIG. 4 is a cross-sectional view taken along lines 4—4 of FIG. 3.

Referring to FIGS. 1–4, there is shown a net 10 formed in a diamond pattern by a plurality of diagonally extending plastic strands or strips 12 and a plurality of diagonally extending plastic strands or strips 14, which plastic strands are at a 76° angle relative to one another. The net 10 includes a plurality of openings 16 formed between the plastic strands. On the top surface 18 of the net 10, the plastic strands 12 are smooth and the plastic strands 14 have a grainy or roughened pattern 15 and "snake skin" appearance. On the bottom surface 20 of the net 10, the plastic strands 12 have a grainy or roughened pattern 13 and "snake skin" appearance. The plastic strands 14 on the bottom surface of the net 10 are smooth. The grainy or roughened pattern and "snake skin" appearance adds to the high friction, slip-resistance of the net 10.

The top and bottom surfaces 18 and 20, respectively, of the net 10 illustrated in FIGS. 1–4 have substantially the same high friction, non-slip characteristics. However, it should be understood the plastic strands 14 on the top surface 18 of the net 10 could be smooth in which case the bottom surface 20 of the net 10 illustrated in FIGS. 1–4 would have better high friction, non-slip characteristics than the top surface 18.

Although the net 10 has been illustrated in FIGS. 1–4 as formed in a diamond pattern, the net 10 may be formed in any one of various patterns such as square, rectangular, oblong, octagonal, etc. Thus, it should be understood that the invention encompasses a net having any regular pattern with openings therebetween. Also, the plastic strands may be at various other angles relative to one another.

Figure 5:
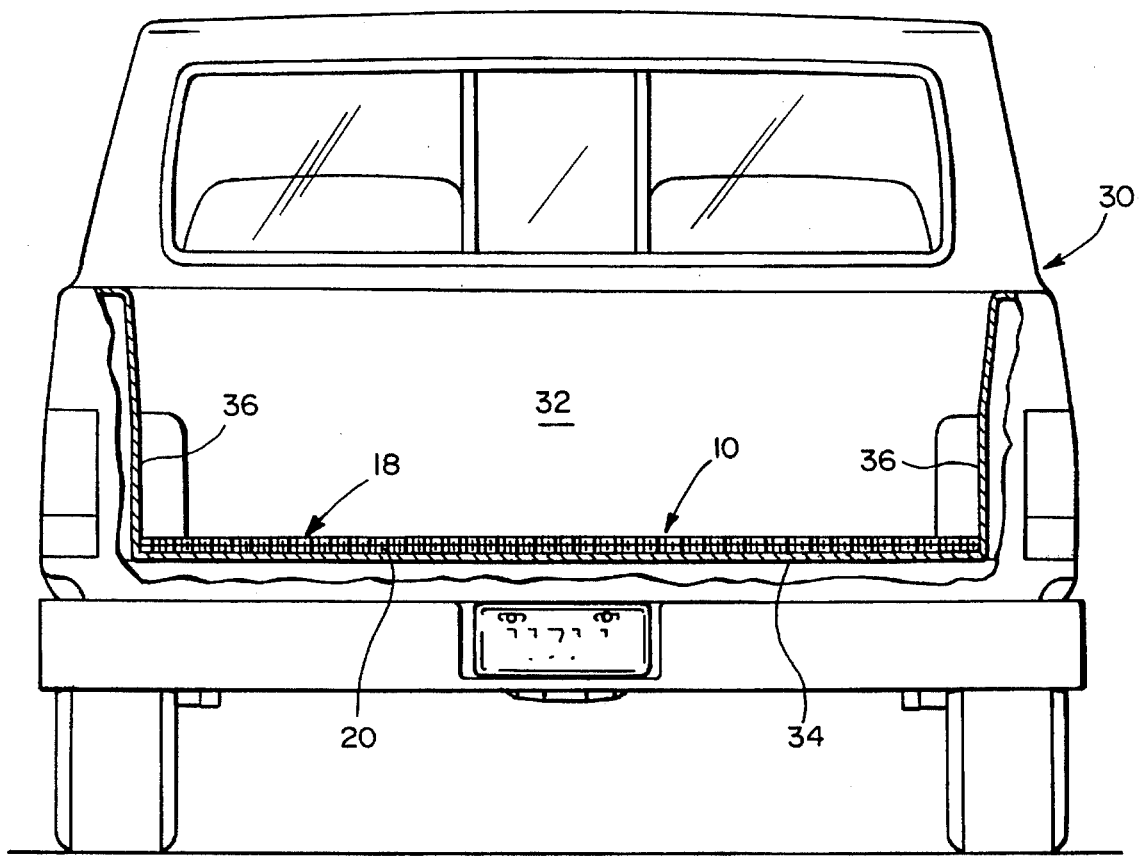
FIG. 5 is a cross-sectional view taken through a truck bed showing the net product according to the invention installed therein.
Figure 6:
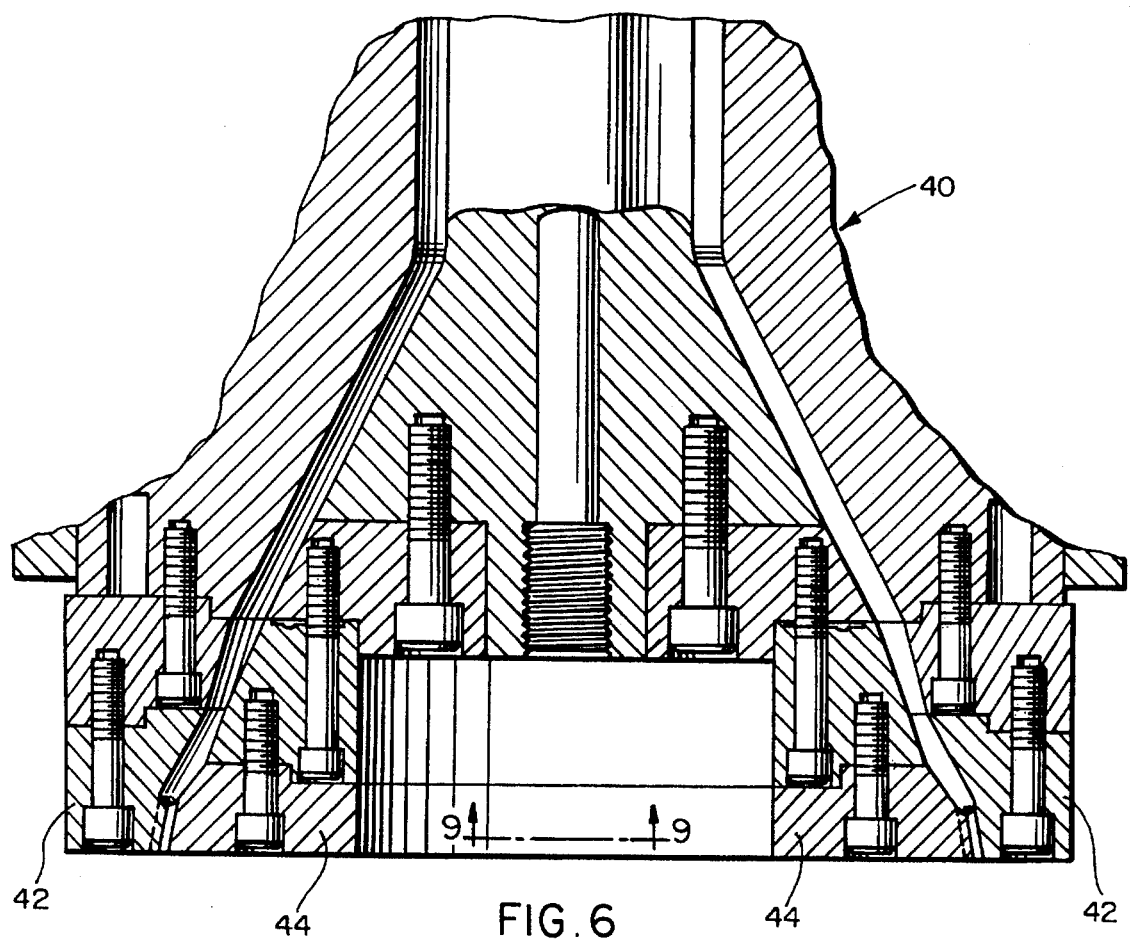
FIG. 6 is a partial cross-sectional view of the bottom half of a die head used in making a net product according to the invention.
Figure 7:
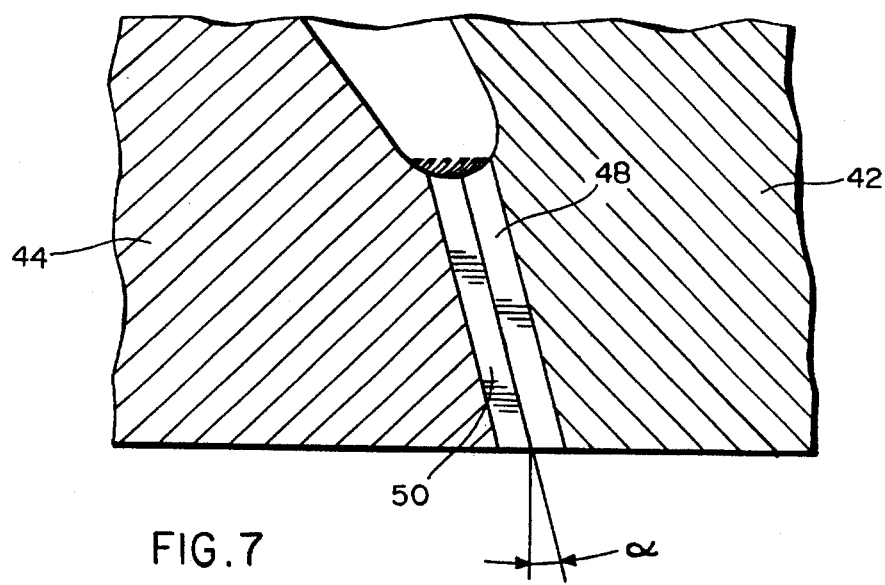
FIG. 7 is an enlarged cross-sectional view showing a set of die slots of FIG. 6 in the aligned position with the die slots illustrated at a 0° helix angle for clarity.
Figure 8:
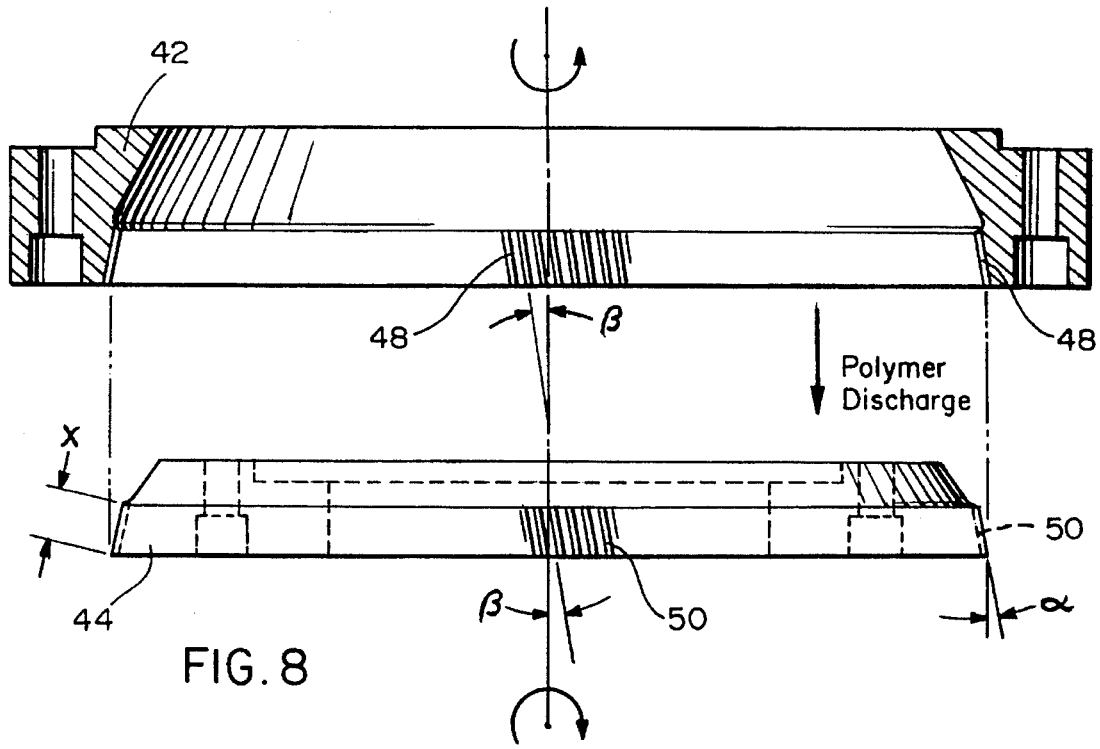
FIG. 8 is an exploded view of the outer and inner dies of the die head of FIG. 6 showing the outer die in cross-section and the inner die in top plan view.

One preferred application of the net 10 of the invention is illustrated in FIG. 5. FIG. 5 illustrates a truck 30 having a truck bed 32. The net 10 of the invention is laid in the bottom 34 of the truck bed 32 between the sidewalls 36 of the truck bed. The high-friction, non-slip bottom surface 20 of the net 10 is positioned contacting the bottom surface 34 of the truck bed. With this arrangement, the net 10 is firmly positioned in the truck bed 32 and resists movement when a load is placed on the top surface 18 of net 10.

The net 10 is formed from a blend of plastics having different densities and peak melting points. The first component of the blend has a density range of about 0.890 to 0.965 g./cc. and a peak melting point range of about 185° to 280° F. and is preferably a very-low-density to high-density polyethylene or a polyethylene formed using single-site metallocene catalyst technology. More specifically, the first component of the blend preferably is a very-low-density polyethylene having a density range of about 0.905 to 0.920 g./cc. and a peak melting point range of about 230° to 250° F., a linear-low-density polyethylene having a density range of about 0.918 to 0.940 g./cc. and a peak melting point range of about 235° to 255° F., a low-density polyethylene having a density range of about 0.917 to 0.934 g./cc. and a peak melting point range of about 210° to 240° F., a medium-density polyethylene having a density range of about 0.935 to 0.946 g./cc. and a peak melting point range of about 240° to 265° F., a high-density polyethylene having a density range of about 0.947 to 0.965 g./cc. and a peak melting point range of about 265° to 280° F. or a polyethylene formed using well known single-site metallocene catalyst technology such as disclosed in U.S. Pat. No. 5,324,800 and having a density range of about 0.890 to 0.945 g./cc. and a peak melting point range of about 185° to 255° F. Most preferably, the first component of the blend is a very-low-density polyethylene having a density of about 0.905 g./cc. and a peak melting point of about 240° F. A preferred very-low-density polyethylene is sold by Dow Plastics, Dow U.S.A., Midland, Mich., under the trademark ATTANE, especially the ATTANE 4403 copolymer. The first component of the blend may also be a flexible polyolefin or a flexible ethylene vinylacetate copolymer having a density range of about 0.922 to 0.944 g./cc. and a peak melting point range of about 217° to 226° F.

The second component of the blend has a density of about 0.865 to 0.889 g./cc. and a peak melting point range of about 120° to 185° F. and is preferably an ultra-low-density polyethylene plastomer. Polyethylene plastomers are formed using well known single-site metallocene catalyst technology such as disclosed in U.S. Pat. No. 5,324,800 which permits very precise control of comonomer which may be incorporated into the polyethylene polymer and of molecular weight distribution. The plastomers are homopolymers of ethylene, or copolymers of ethylene with higher alpha-olefins having from 3 to about 10 carbon atoms such as 1-butene, 1-hexene and 1-octene. The plastomers are commercially available from Dow Plastics, Dow U.S.A., Midland, Mich., under the trademark ENGAGE, especially ENGAGE EG8100 (an ethylene/1-octene copolymer). The ENGAGE plastomers have a density range of about 0.865 to 0.889 g./cc. and a peak melting point range of about 120° to 185° F. Suitable plastomers also are available from Exxon Chemical Americas, Polymer Group, under the trademark EXACT. The EXACT plastomers have similar density and peak melting point ranges as defined for the Dow plastomers.

The polymer blend includes 20 to 75% by volume of the first component, preferably about 61 to 64% by volume, and 25 to 80% by volume of the second component, preferably about 31 to 34% by volume. When used as a truck bed liner, the first and second components are blended to provide heat resistance at temperatures of at least 170° F., preferably at least 200° F.

The net of the invention may be produced using well known die technology such as disclosed in U.S. Pat. No. 2,919,467, the disclosure of which is expressly incorporated herein by reference. The first and second components of the polymer blend are fed into a tumble mixer gravimetrically or volumetrically. Depending upon the components of the polymer blend, the preferred extrusion temperatures in the feed zone are about 200° to 450° F., typically about 270° F., in the barrel zones are about 270° to 425° F., typically about 350° to 390° F., and at the die head are about 300° to 475° F., typically about 450° F. The extruder is generally a single stage, dual channel, barrier extrusion screw of about 3 to 10 inches, preferably about 8 inches. The melt is extruded through the dies at an extrusion rate of about 100 to 3000 lb./hr., typically about 700 lb./hr.

Using conventional technology such as generally described in U.S. Pat. No. 2,919,467, the melt curtain which consists of a net produced from the dies is oriented over a mandrel. The mandrel is attached to the die head assembly such that the top of the mandrel is below the die face surface. The melt curtain travels vertically through a tank filled with cooling water. The net is then cut open with a blade located preferably near the bottom of the tank and then travels around an idler roll near the bottom of the tank. The net then travels through a web spreader assembly intended to open and slit the tube of net for winding purposes. A haul-off nip system provides the tension and drive to pull the net from the die to the beginning of the winding system.

Figure 9:
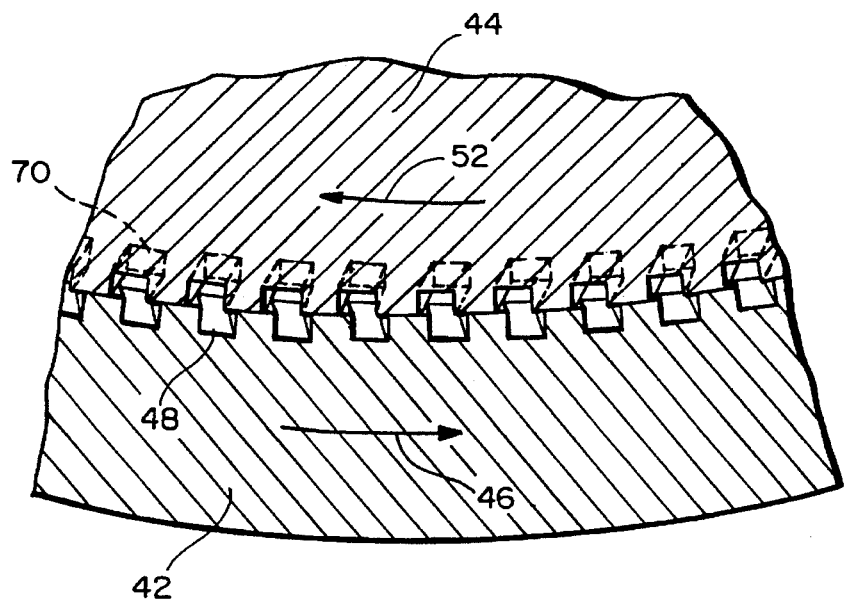
FIG. 9 is a cross-sectional view taken along lines 9—9 of FIG. 6.

A typical counter-rotating die head which may be used in accordance with the invention is illustrated in FIGS. 6–9. The die head 40 includes counter-rotating outer and inner dies 42 and 44, respectively. Outer die 42 is illustrated as rotating in counter-clockwise direction 46, and inner die 44 is illustrated as rotating in clockwise direction 52 as illustrated in FIG. 9. Outer die 42 has die slots 48, and inner die 44 has die slots 50. In accordance with one preferred aspect of the invention, the land angle "β" is about 10° to 20°, typically about 15°, and the helix angle "γ" is about 0° to 15°, typically about 10°. The land length "X" is about 0.150 to 0.500 inch, typically about 0.310 inch. The die slots have a width of about 0.080 to 0.110 inch, typically about 0.094 inch, and a depth of about 0.050 to 0.090 inch, typically about 0.067 inch.

The grainy or roughened pattern and "snake skin" appearance on the top and bottom surfaces 18 and 20, respectively, of the net 10 illustrated in FIGS. 1–4 is caused by a phenomenon called melt fracture. Melt fracture occurs in converging flow channels at high flow rates. The melt accelerates and, if the rate of extension is too great, the melt simply breaks, i.e., fractures. Under the prevailing hydrostatic pressure, the melt fuses together again, but some elements of the melt fracture and some do not. Thus, when the melt leaves the die, the swelling is uneven leading to loss of surface gloss from slight surface ripples.

For a given set of processing conditions and die geometry, there is a critical shear rate for a specific plastic blend above which fracture will occur. Melt fracture may occur due to alternate sticking and slippage of the plastic blend as it progresses from die entry to the die land. The high friction, non-slip characteristics of the net of the invention may be enhanced by the presence of this melt fracture. Melt fracture is achieved especially by selection of the land length "X" (i.e., the longer the land length the higher the melt fracture) and design of the die slots 48 and 50, and by roughening the surfaces of the die slots 48 and 50 using carbide tools or the like.

The high friction, slip-resistance of the net 10 also may be enhanced by incorporating blowing agents into the blend of plastics rather than using the phenomenon of melt fracture. Suitable blowing agents are diazo carbamide sold by Uniroyal Chemical Company, Inc., Middleburg, Conn., under the trademark CELOGEN AZ and para-toluene sulphonyl semicarbazide sold by Uniroyal under the trademark CELOGEN RA.

Although melt fracture and the use of blowing agents have been disclosed as methods of enhancing the high friction, slip-resistance of the net 10, it should be understood that no enhancement of these properties is required for the net 10 to function properly as a truck bed liner or the like. Thus, the net 10 will not necessarily have the grainy or roughened patterns 13, 15 illustrated in FIGS. 1–4.

In accordance with the invention, the coefficient of friction of the net is significantly increased as compared with the same type of net produced from low-density polyethylene. For example, typical results using ASTM method 1894 with a net against a metal plate for low-density polyethylene are static friction equal 0.728 grams force (gf) and dynamic friction equal 0.700 gf. By contrast, in accordance with the invention, values of static friction equal to 1.26 gf and dynamic friction equal 1.20 gf have been achieved. Generally speaking, the coefficient of friction of the net according to the present invention will be above 0.8 gf.

Nets made in accordance with the invention have a relatively low flex modulus. The flexural rigidity of the nets is typically less than 130,000 mg-cm using ASTM method D-1388-64.

Other typical characteristics of net products made in accordance with the present invention are illustrated in the following table:

TABLE

| Weight/ Length (LB/M) | Weight/ Area (LB/M2) | Thickness (mm) | Mesh Count (cm/5 Strands) | Mesh Angle (o) | Tensile Strength (KN/M) |
|---|---|---|---|---|---|
| 3.26 | 1.9 | 3.4 | 4.5 | 76 | 6.5 |

Having described the invention, many modifications thereto will become apparent to those skilled in the art to which it pertains without deviation from the spirit of the invention as defined by the scope of the appended claims.

We claim:

1. A high friction, non-slip plastic net comprising a plurality of plastic strands formed in a pattern having openings therebetween, said plastic strands being a blend of at least first and second components having different densities and melting points, said first component having a density of about 0.890 to 0.965 g./cc. and a peak melting point range of about 185° to 280° F. and said second component having a density of about 0.865 to 0.889 g./cc. and a peak melting point range of about 120° to 185° F.

2. The net of claim 1 wherein said first component is a very-low-density polyethylene, a linear-low-density polyethylene, a low-density polyethylene, a medium-density polyethylene, a high-density polyethylene, or a metallocene polyethylene.

3. The net of claim 1 wherein said first component is a flexible polyolefin or a flexible ethylene vinylacetate copolymer.

4. The net of claim 1 wherein said second component is an ultra-low-density polyethylene plastomer.

5. The net of claim 4 wherein said plastomer is a copolymer of ethylene with a higher α-olefin having from 3 to about 10 carbon atoms.

6. The net of claim 5 wherein said α-olefin is 1-butene, 1-hexene or 1-octene.

7. The net of claim 1 wherein said pattern is a diamond, square, rectangular, oblong, or octagonal pattern.

8. The net of claim 1 wherein at least one surface of a portion of said plastic strands has a grainy or roughened pattern which enhances the high-friction, non-slip characteristics of said net.

9. The net according to claim 8 wherein said net is extruded and said grainy or roughened pattern is formed by melt fracture.

10. The net according to claim 8 wherein said net is extruded and said grainy or roughened pattern is formed by blowing agents incorporated into the blend of first and second components.

11. The net of claim 1 wherein the coefficient of friction of said net is above 0.8 gf.

12. The net of claim 1 wherein said net has a flexural rigidity of less than 130,000 mg-cm.

13. A truck bed liner positioned in contact with a truck bed comprising a high friction, non-slip and heat resistant plastic net having a plurality of plastic strands formed in a pattern having openings therebetween, said plastic strands being a blend of at least first and second components having different densities and melting points, said first component having a density of about 0.890 to 0.965 g./cc. and a peak melting point of about 185° to 280° F. and said second component having a density of about 0.865 to 0.889 g./cc. and a peak melting point of about 120° to 185° F., said net having a peak melting point of at least 170° F.

14. The truck bed liner of claim 13 wherein said first component is a very-low-density polyethylene, a linear-low-density polyethylene, a low-density polyethylene, a medium-density polyethylene, a high-density polyethylene, or metallocene polyethylene.

15. The truck bed liner of claim 13 wherein said first component is a flexible polyolefin or a flexible ethylene vinylacetate copolymer.

16. The truck bed liner of claim 13 wherein said second component is an ultra-low-density polyethylene plastomer.

17. The truck bed liner of claim 16 wherein said plastomer is a copolymer of ethylene with a higher α-olefin having from 3 to about 10 carbon atoms.

18. The truck bed liner of claim 17 wherein said α-olefin is 1-butene, 1-hexene or 1-octene.

19. The truck bed liner of claim 13 wherein said pattern is a diamond, square, rectangular, oblong or octagonal pattern.

20. The truck bed liner of claim 13 wherein at least one surface of a portion of said plastic strands has a grainy or roughened pattern which enhances the high-friction, non-slip characteristics of said net.

21. The truck bed liner according to claim 20 wherein said net is extruded and said grainy or roughened pattern is formed by melt fracture.

22. The net according to claim 18 wherein said net is extruded and said grainy or roughened pattern is formed by blowing agents incorporated into the blend of first and second components.

23. The net of claim 13 wherein the coefficient of friction of said net is above 0.8 gf.

24. The net of claim 13 wherein said net has a flexural rigidity of less than 130,000 mg-cm.

* * * * *